March 21, 1967  W. M. McBRIDE, JR  3,309,770
ROASTING FORK
Filed Jan. 17, 1966
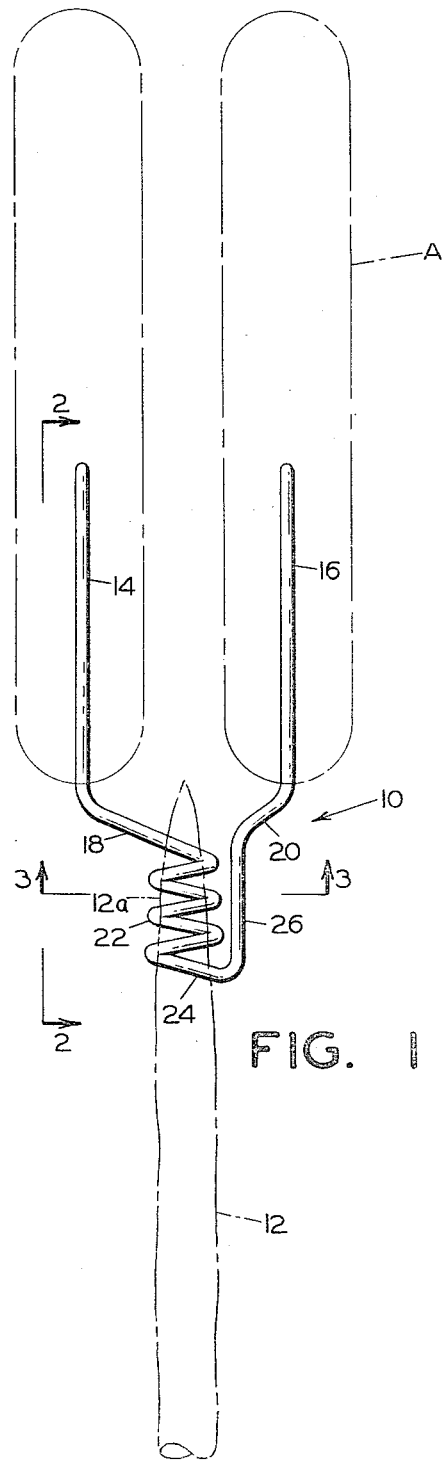
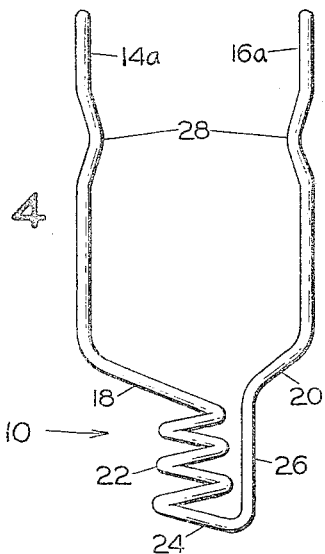
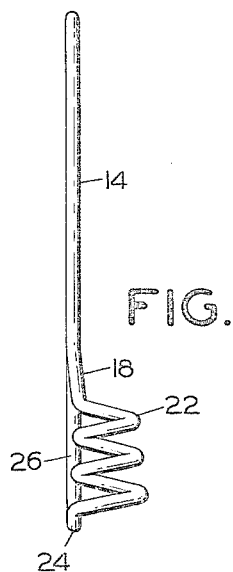
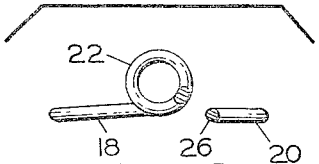
INVENTOR.
WILLIS M. McBRIDE, JR.
BY Eugene M. Eckelman
ATTORNEY

# United States Patent Office 3,309,770
Patented Mar. 21, 1967

3,309,770
ROASTING FORK
Willis M. McBride, Jr., 11304 SW. Boones Ferry Road, Portland, Oreg. 97219
Filed Jan. 17, 1966, Ser. No. 521,206
4 Claims. (Cl. 30—322)

This invention relates to a roasting fork and more particularly is concerned with a fork structure arranged to impale food objects for roasting such objects over a fire.

A primary objective of the present invention is to provide a roasting fork of the type described which is simplified and inexpensive in its construction and at the same time is adapted efficiently to support at least two articles of food for roasting over a fire.

Another object is to provide a roasting fork of the type described which is formed from a single piece of wire in a construction having a pair of tines and a novel interconnecting handle receiving portion.

Briefly stated, the fork comprises a pair of tines which extend substantially parallel to each other and which are connected together at their rearward ends by a handle receiving end. Rearward extending portions of the tines are selectively bent to form such handle receiving end which includes a conical, spiral coil portion which acts as a locking thread for releasable attachment of a supporting handle. The invention will be better understood and additional objects will become apparent from the following specification and claims, considered together with the accompanying drawings wherein the numerals of reference indicate like parts and wherein In the drawings:

FIGURE 1 is a plan view of the present roasting fork, the handle therefor being shown in phantom lines;

FIGURE 2 is a side elevational view taken on the line 2—2 of FIGURE 1;

FIGURE 3 is a cross sectional view taken on the line 3—3 of FIGURE 1; and

FIGURE 4 is a plan view of a modified form of tine for the fork.

Referring in particular to the drawings, the numeral 10 designates generally the head portion of the fork and the numeral 12 designates the handle. The head portion 10 is formed from a single piece of wire or the like which is bendable but yet has sufficient rigidity adequately to support food articles A, such as wieners, for roasting while disposed in projected mounted relation on the end of the handle 12.

The head portion 10 as suitably shaped comprises a pair of tine members 14 and 16 having a sufficient length to support, by impaling, food articles thereon. Leading from the rearward end of tines 14 and 16 is a tine interconnecting and handle receiving end. Such end comprises inward and rearward angled portions 18 and 20 leading from the tines 14 and 16, respectively. Leading rearwardly from the rearward end of angled portion 18 is a conical, spiral coil portion 22 which extends in a line substantially parallel to the tines 14 and 16 whereby when the head portion 10 is mounted on a handle connected to the coil portion 22 said tines form a substantially straight projection from the handle. As seen in the drawings, the apex of the coil portion 22 is disposed at the forward end thereof, and a wire portion 24 which leads from the rearward end of the coil portion extends from the outer periphery thereof in order that the rearward end of the coil portion will be open for receiving the handle 12.

Wire portion 24 extends in a lateral direction to a longitudinally projecting wire portion 26 in turn leading to the angled wire portion 20.

For the purpose of mounting the head portion 10 on a handle 12, the handle is provided with a forward tapered end 12a. Furthermore, the coils of the portion 22 are sufficiently open or in other words are spaced longitudinally from each other such that they have an efficient screw attaching engagement with the tapered end 12a of the stick. That is, the handle 12, which in most instances will comprise a wooden switch or the like, is secured in the coil portion by rotatably moving the tapered end into the open end of the coil portion while at the same time urging the two members together forcibly, whereby the spiral portions of the coil 22 groove the tapered portion 12a to form a shallow thread on the tapered portion and obtain a positive grip thereon.

The head 10 has the feature that it is simplified in its construction and inexpensive to manufacture. Furthermore, the head is light in weight and since it may be manufactured and sold without the handle 12, packaging and shipping is made easy. In the usual case the handle 12 will comprise merely a stick or switch found at the site of use of the fork, and when using such a handle it is merely cut to a taper at its forward end for engaging the coil portion 22. It is to be understood of course that a manufactured handle may be supplied with the head 10 if desired.

FIGURE 4 illustrates a modified construction wherein tines 14a and 16a are provided with jog or bend portions 28 intermediate the ends thereof. These jog portions serve to better grip the food article impaled on the tines than the straight tines. The remaining structure of FIGURE 4 is identical to that of FIGURE 1 including the conical, spiral portion which acts as a locking thread for releasable attachment of the head portion 10 on a handle.

It is to be understood that the forms of my invention herein shown and described are to be taken as preferred examples of the same and that various other changes in the shape, size and arrangement of parts may be resorted to without departing from the spirit of my invention or the scope of the subjoined claims.

Having thus described my invention, I claim:

1. A roasting fork formed from a single piece of bendable material comprising a pair of elongated, substantially parallel tines the forward ends of which comprise the terminal ends of said piece of material, and a rearward end structure interconnecting said tines; said rearward end structure including a conical, spiral coil portion leading rearwardly from the rearward end of one of said tines and having the apex thereof disposed forwardly, said coil portion being arranged to rotatably receive and grip a forward end of a handle, a laterally extending portion leading from the rearward end of said coil portion, and a forwardly extending portion leading from said laterally extending portion and leading to the rearward end of said other tine.

2. The roasting fork of claim 1 including an inwardly directed portion leading from the rearward end of said one tine to the forward end of said coil portion and an inwardly directed portion leading from the rearward end of said other tine to the forward end of said forwardly extending portion.

3. The roasting fork of claim 1 which includes a handle member in combination therewith, said handle member having a forward tapered end rotatably received and gripped in said coil portion.

4. The roasting fork of claim 1 wherein at least one of said tines has a jogged portion therein intermediate its ends.

References Cited by the Examiner
UNITED STATES PATENTS 1,829,192  10/1931  Shaffer _____ 30—322
2,858,611  11/1958  Arneberg _____ 30—322

WILLIAM FELDMAN, Primary Examiner.

G. WEIDENFELD, Examiner.